United States Patent
Hiratsuka et al.

(10) Patent No.: US 7,028,108 B2
(45) Date of Patent: Apr. 11, 2006

(54) SYSTEM AND METHOD FOR CONTROLLING DATA TRANSFER FOR DATA ARRAY CONTROL UNIT HAVING FIRST AND SECOND SELECTOR WITH DATA SHIFT REGISTER

(75) Inventors: Shinji Hiratsuka, Osaka (JP); Mineo Fujii, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 689 days.

(21) Appl. No.: 10/100,180

(22) Filed: Mar. 19, 2002

(65) Prior Publication Data
US 2002/0144085 A1 Oct. 3, 2002

(30) Foreign Application Priority Data
Mar. 19, 2001 (JP) .............................. 2001-078509

(51) Int. Cl.
*G06F 13/00* (2006.01)
*H03M 9/00* (2006.01)
(52) U.S. Cl. .............................. 710/33; 710/1; 710/16; 710/31; 710/71; 712/25; 712/27; 375/145; 375/240.21; 341/100

(58) Field of Classification Search .................... 710/1, 710/16, 31, 33, 71; 712/25, 27; 375/240.21, 375/145; 341/100
See application file for complete search history.

(56) References Cited

U.S. PATENT DOCUMENTS
6,687,303 B1 * 2/2004 Ishihara ................. 375/240.21

* cited by examiner

*Primary Examiner*—Tammara Peyton
(74) *Attorney, Agent, or Firm*—Volentine Francos & Whitt, PLLC

(57) ABSTRACT

A data register which outputs an input data as is when the input data fulfills a set data width for outputting, and holds the input data until a bit width of the input data is equal to or more than the set data width, in response to a first enable signal. A first selector which selects an n-bit byte lane from a (2n−1)-bit byte lane of the data register in response to a first select signal, and a second selector which selects an n-bit byte lane out of a (2n−1)-bit byte lane and outputs a valid data in response to a second select signal. A data buffer which receives and stores the valid data in response to a second enable signals.

14 Claims, 13 Drawing Sheets

FIG. 11
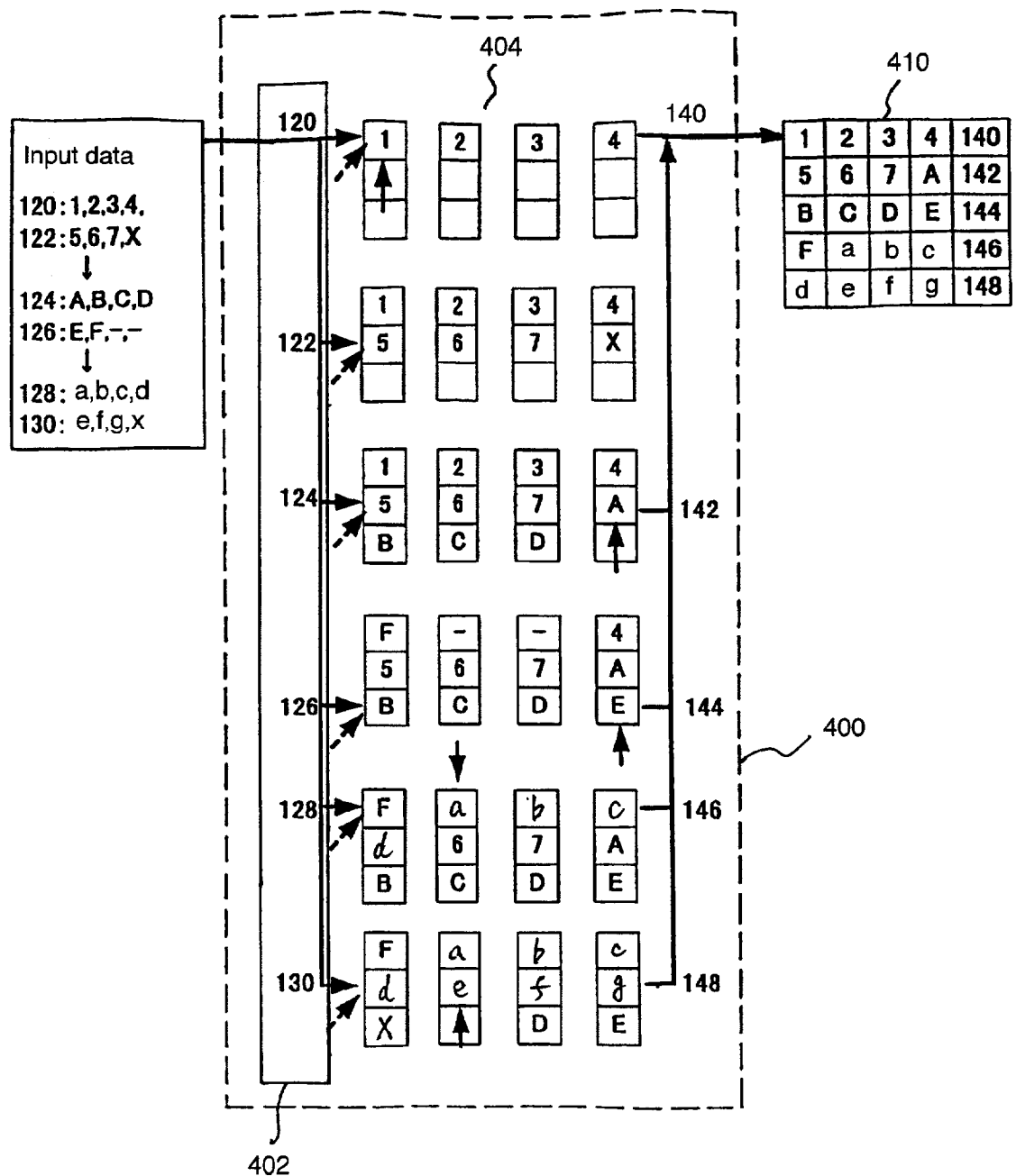
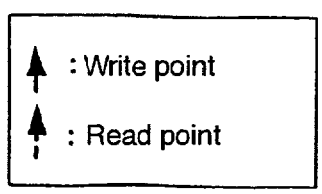

SYSTEM AND METHOD FOR CONTROLLING DATA TRANSFER FOR DATA ARRAY CONTROL UNIT HAVING FIRST AND SECOND SELECTOR WITH DATA SHIFT REGISTER

BACKGROUND OF THE INVENTION

1. Field of the Invention

The present invention relates to a system for controlling a data transfer and a method of controlling a data transfer, and more particularly controlling a data transfer so as to receive valid data in progression when the input data includes the valid data and invalid data.

The present application claims priority under 35 U.S.C. §1 19 to Japanese Patent Application No. 2001-78509, filed Mar. 19, 2001, which is herein incorporated by reference in its entirely for all purposes.

2. Description of the Related Art

In a conventional system for controlling a data transfer, a receiving apparatus can receive a valid data only in response to an enable signal which has a predetermined bit byte width of a valid data bus, when the conventional receiving apparatus receives the data from a data bus which has an optional bit byte width.

Another conventional system for controlling a data transfer removes the invalid data from an input data, and then only the valid data is stored as an output data. Such a conventional system for controlling a data transfer is hereinafter described.

FIG. 13 is an explanation diagram describing conventional data processing and data storing. At first, the invalid data which is unnecessary for an operation is removed from input data 20, 22, 24, 26, 28 and 30 by software processing. It is noted that in FIG. 2, "X" is indicative of invalid data and "–" is indicative of no data. Then, only the valid data which is necessary for the operation is stored as output data 40, 42, 44, 46, 48 and 50. Therefore, a continuity of the valid data which is necessary for the operation can be maintained.

However, conventional system for controlling a date transfer can not maintain the continuity of valid data, if the receiving apparatus does not use the enable signal and also does not perform data processing using software. There is thus a need to provide a control system and method which can maintain the continuity of valid data to thereby output the valid data only, without using enable signals which indicate the predetermined bit byte width of a valid data bus, and without using data processing using software, when a receiving apparatus receives data through a data bus which has an optional bit byte width.

SUMMARY OF THE INVENTION

The present invention is therefore directed to a system and a method for controlling a data transfer, which substantially overcome one or more of the problems due to limitations and disadvantages of the related art.

It is therefore an objective of the invention to provide a system for controlling a data transfer whereby valid data can be received in progression, when the input data includes the valid data and invalid data.

To achieve these and other objects, a system for controlling data transfer includes a data register which outputs an input data as is when the input data fulfills a set data width for outputting and holds the input data until a bit width of the input data is equal to or more than the set data width for outputting, in response to a first enable signal, a first selector which selects an n-bit byte lane from a (2n–1)-bit byte lane of the data register in response to a first select signal, a second selector which selects an n-bit byte lane out of a (2n–1)-bit byte lane and outputs a valid data in response to a second select signal, a data buffer which receives and stores the valid data in response to a second enable signals, and a controller which generates the first and second select signals, and the first and second enable signals.

According to the present invention, the continuity of the valid data which is necessary for the operation can be mentioned, without the need for using any enable signals which shows the predetermined bit byte width of the valid data bus, and without the need for using the data processing by the software, even though the receiving apparatus receives the data through a data bus which has the optionally bit byte width.

The above and further objects and novel features of the invention will become more fully apparent from the following detailed description, appended claims and accompanying drawings herein.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings, which are not to be construed as limiting, and in which:

FIG. 11 is an explanation diagram describing the data processing and the data storing when a data bus has a 4-bit byte width, according to the fourth embodiment of the present invention;

DETAILED DESCRIPTION OF THE PREFERRED EMBODIMENTS

Preferred embodiments of the present invention will hereinafter be described in detail with reference to the accompanying drawings. The drawings used for this description typically illustrate major characteristic parts to facilitate understanding of the invention.

Figure 1:
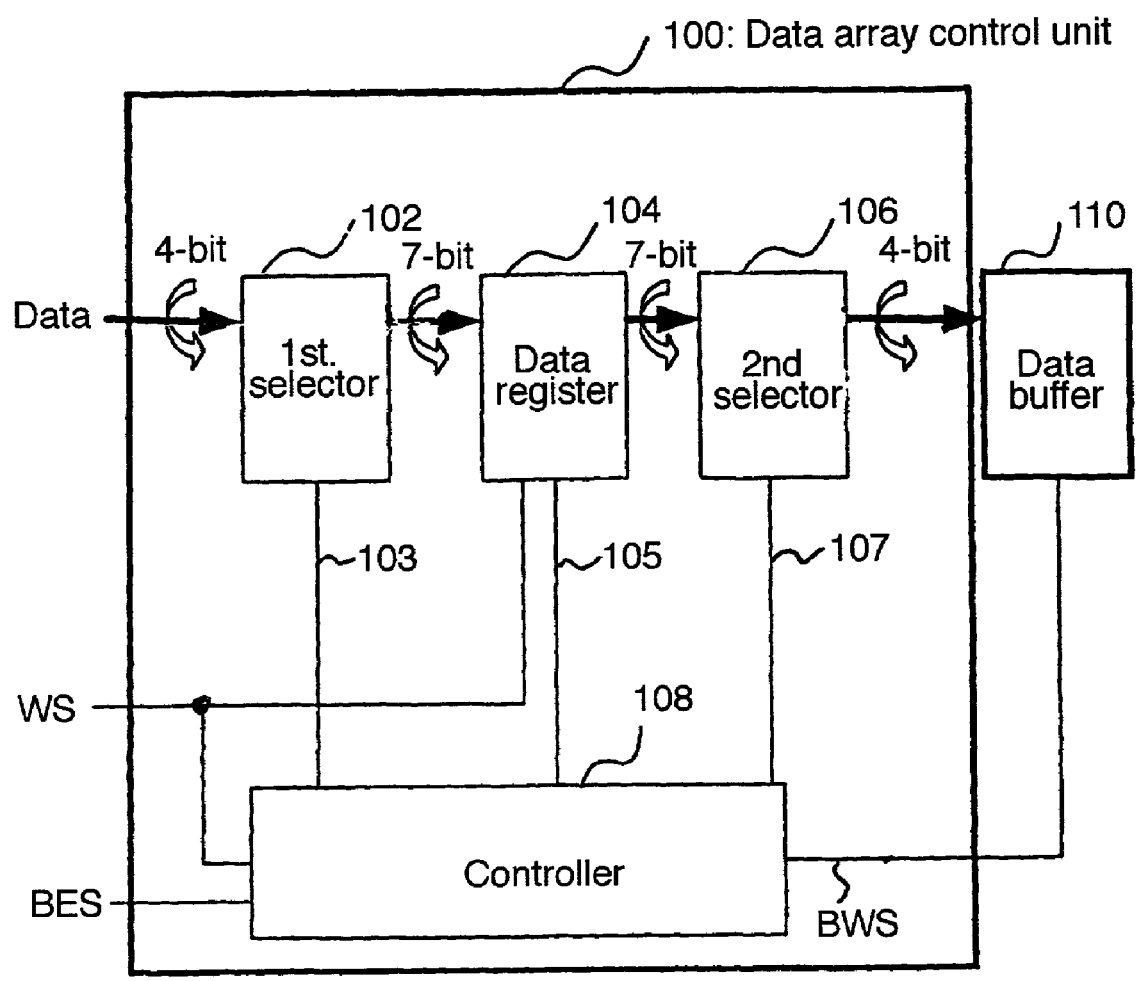
FIG. 1 is a block diagram of a data array control unit according to a first embodiment of the present invention.
Figure 2:
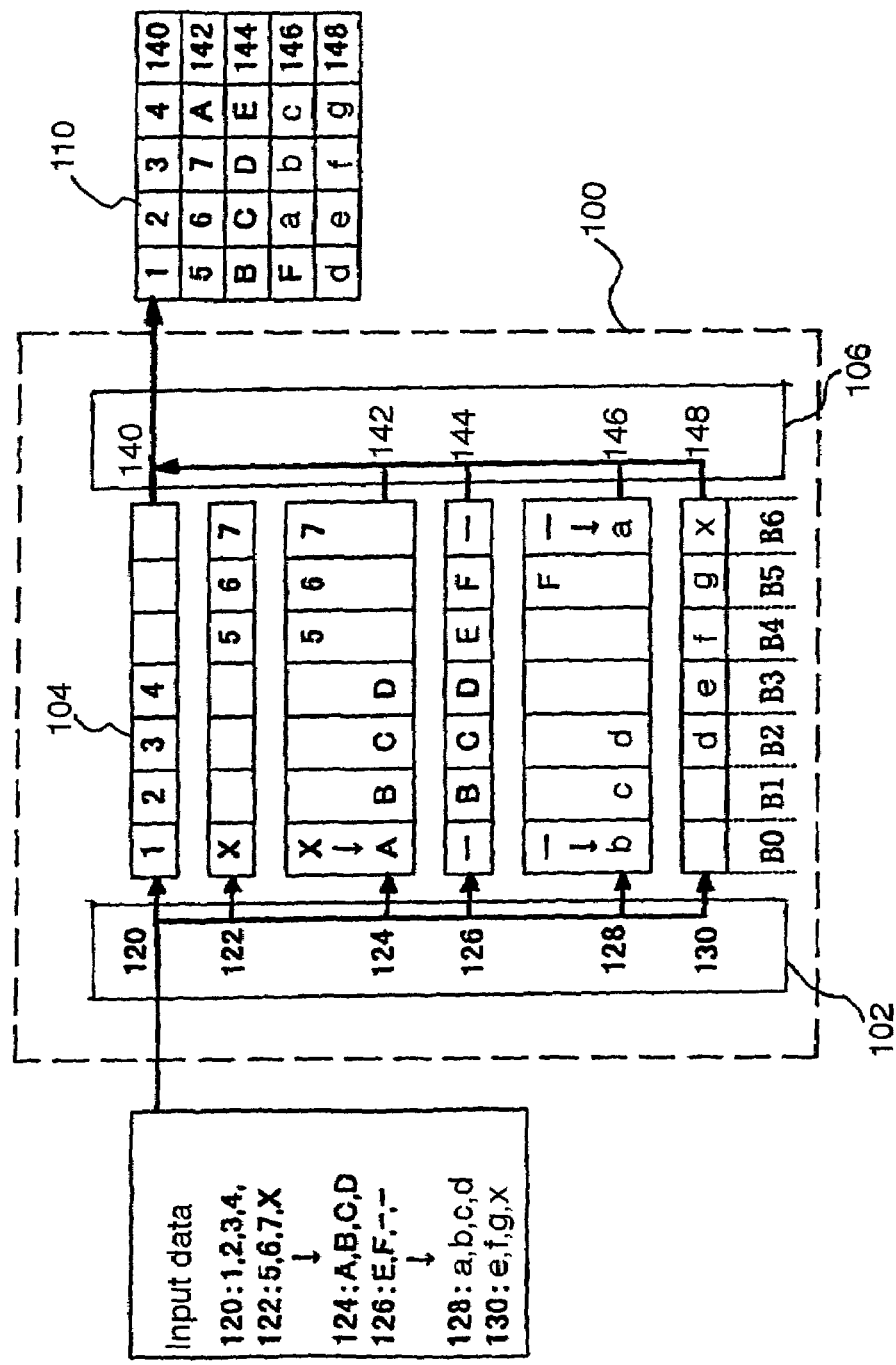
FIG. 2 is an explanation diagram describing the data processing and the data storing when a data bus has a 4-bit byte width, according to the first embodiment of the present invention.

FIG. 1 is a block diagram of a data array control unit 100 according to a first embodiment of the present invention. FIG. 2 is an explanation diagram describing the data processing and the data storing when a data bus has a 4-bit byte width according to the first embodiment of the present invention. In the first embodiment of the present invention, a data bus is constructed with a 4-bit byte width, and a data register has a 7-bit byte lane. And, data of the 4-bit byte width is inputted into the data array control unit 100 as input data 120, 122, 124, 126, 128 and 130 in order The data array control unit 100 includes a first selector 102, a data register 104, a second selector 106 and a controller 108. The first selector 102 is located at an input side of the data register 104, receives an input data on the data bus, receives a first select signal 103 from the controller 108, and provides an output to the data register 104. The second selector 106 is located at an output side of the data register 104, receives an output from the data register 104 and a second select signal 107 from the controller 108, and provides an output to the data buffer 110. The data buffer 110 receives a buffer write enable signal BWS from the controller 108. The controller 108 generates the first and second select signals 103 and 107, the enable signal 105 and the buffer write enable signal BWS responsive to a byte enable signal BES and a write signal WS. The data array control unit 100 is connected to the data buffer 110 which has a 4-bit byte lane.

Operation of the data array control unit 100 of FIG. 1 is now described with reference to FIG. 2 and FIG. 3. The input data on the data bus is provided with 4-bit byte width which are shown in FIG. 2 as bytes 120, 122, 124, 126, 128 and 130, as including random data. It is noted that in FIG. 2, "X" is indicative of invalid data and "–" is indicative of no data.

The first selector 102 selects a 4-bit byte lane out of the 7-bit byte lane, and provides the 4-bit byte of input data on the selected 4-bit byte lane to the data register 104, in response to a first select signal 103 which is output from the controller 108. As shown in FIG. 2, the input data 120 is inputted into bit-byte lanes B0–B3 of the data register 104 which are selected by the first selector 102 at a first cycle, and the input data 122 is inputted into bit-byte lanes B0 and B4–B6 of the data register 104 which are selected by the first selector 102 at a second cycle.

When the received input data fulfills a set data width for outputting, the data register 104 outputs the input data as is, in response to an enable signal 105 which is output from the controller 108. For example, when the input data 120 is inputted into the register 104, the register 104 outputs the input data 120 as is. In other words, when the received input data doesn't fulfill the set data width for outputting, the register 104 holds the input data until a bit width of the input data is equal or more than the set data width for outputting, and then outputs data. For example, when the input data 122 is inputted into the data register 104, the data register 104 stores the input data 122 until the input data 124 at a next cycle is inputted and then outputs data of the set data width as a valid data.

The second selector 106 selects 4-bit byte lanes out of the 7-bit byte lane provided by the data register 104 so as to pass the input data, in response to a second select signal 107 which is output from the controller 108.

An example of how the data from the data bus is provided to data buffer 110 through the data array control unit 100 is further described as follows. In a first or previous cycle, the first 4-bit byte 120 of input data (1, 2, 3, 4), is provided to the first selector 102. The first selector 102 selects a 4-bit byte lane in order to provide the 4-bit byte 120 to the data register 104. For example, the data register 104 may be a 7-bit byte memory, and the 4-bit byte of input data may be provided to any 4 consecutive positions of byte lanes within the memory. In the first cycle, the input data is provided to the 4-bit byte lane in the data register 104 consisting of bit locations B0, B1, B2 and B3. Then, the 4 bits of valid data (1, 2, 3, 4) are provided to the data buffer 110 through the second selector 106 under control of the second select signal 107 because the 4-bit byte 120 of the first cycle includes 4 consecutive valid bits of data.

In the second or next cycle, the second 4-bit byte 122 (5, 6, 7, X), is provided to the first selector 102. In this instance, only three valid bits of data are included in the input data byte, wherein the fourth bit is invalid data, represented by "X". The first selector 102 selects a 4-bit byte lane which is located consecutively after the 4-bit byte lane selected during the first cycle. Thus, the 4-bits of data are stored in bit locations B4, B5, B6 and B0. Then, only 3-bits of valid data (5, 6, 7) of the second cyde are correctly stored in the data register 104.

Responsive to the determination that only 3- valid bits of data (5, 6, 7) are stored, the data register 104 does not provide output to the second selector 106. The 3-bits of valid data (5, 6, 7) from the current cycle are held as remaining bits. Under control of the controller 108, the third or following cycle is carried out, so that the next 4-bit byte 124 (A, B, C, D) is inputted to the first selector 102. As above described, the first selector 102 selects a 4-bit byte lane which is located consecutively after the 3-bit byte lane selected during the second cycle. Thus, the 4-bits of data (A, B, C, D) are stored in bit locations B0, B1, B2 and B3. Then, the data register 104 provides 4 consecutive bits of valid data (5, 6, 7, A) which are stored in bit locations B4, B5, B6 and B0.

The controller 108 has characteristics as follows.

1) It generates the first select signal 103 at the present cycle, in accordance with a number of byte enable signals BES provided during the previous cycle.

2) It generates a buffer write enable signal BWS in accordance with a number of remaining bits from the previous cycle and a number of byte enable signals BES provided during the current cycle.

3) It generates the second select signal 107 of the next cycle in accordance with logic states of the buffer write enable signal BWS which shows valid and invalid states of the buffer write enable signal BWS.

4) It generates the enable signal 105 in accordance with a number of remaining bits from the previous cycle, a number of byte enable signals BES provided during the current cycle and logic states of the buffer write enable signal BWS during the current cycle.

Figure 3:
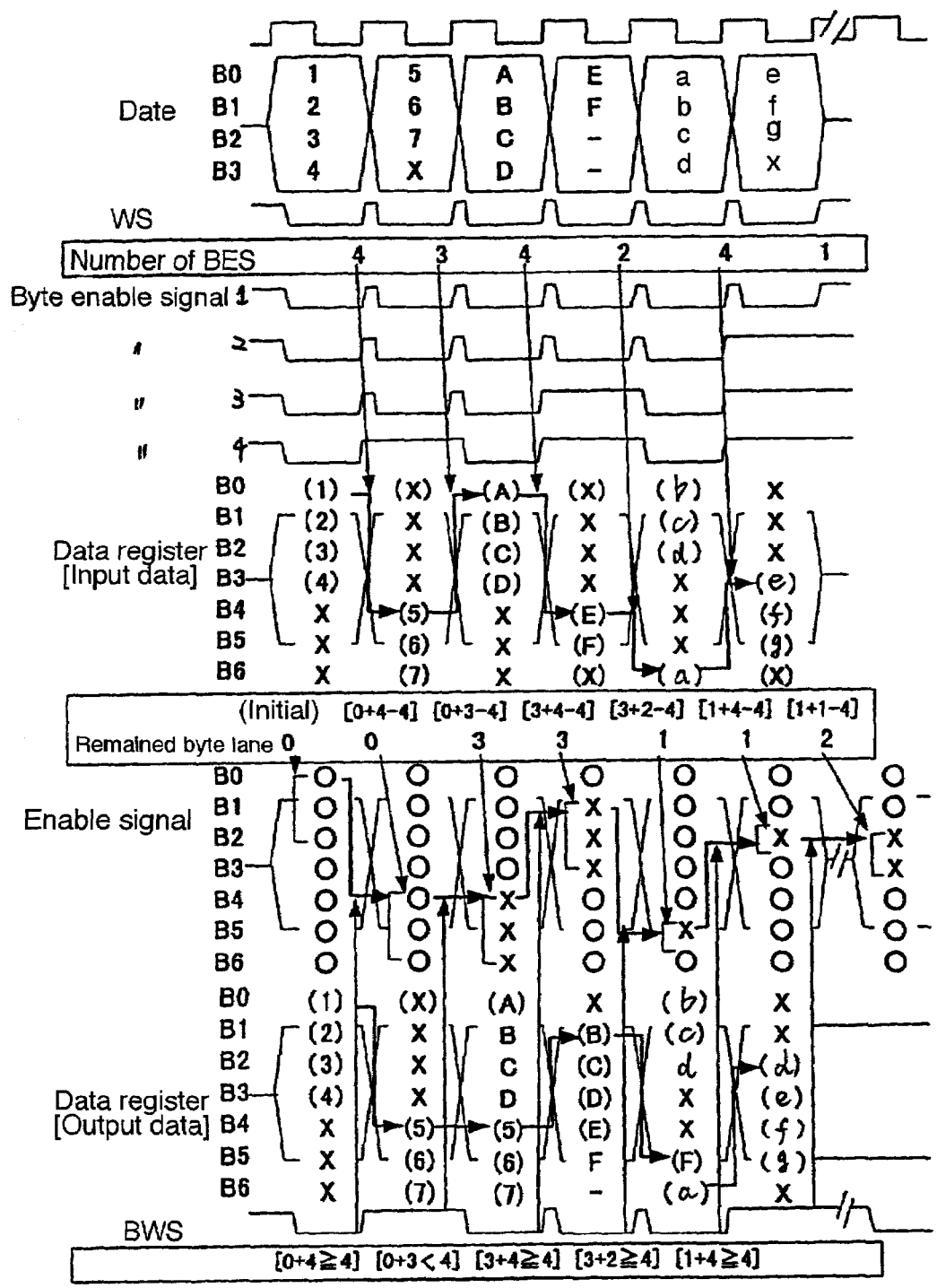
FIG. 3 is an explanation diagram describing a data array timing according to the first embodiment of the present invention.

FIG. 3 is an explanation diagram describing a data array timing according to the first embodiment of the preset invention.

The first selector 102 outputs the input data of the 4-bit byte width to bit locations B0, B1, B2 and B3 as a valid data, in response to initial values B0, B1, B2 and B3 of the first select signal 103. The parenthetic data in Data register [Input Data] shows the input data of the 4-bit byte width as the valid data, as shown in FIG. 3.

The data register 104 outputs and latches the data of the 7-bit byte lane B0–B6 in response to initial values B0–B6 of the enable signal 105. The data of the 7-bit byte lane B0–B6 is shown as Data register [Output data] in FIG. 3.

The second selector 106 selects 4-bit byte lane B0–B3 from the 7-bit byte lane B0–B6 and outputs data of the 4-bit byte lane B0–B3 as a valid data, in response to initial values B0–B3 of the second select signal 107. The parenthetic data in Data register [Output data] shows data of the 4-bit byte lane as the valid data, as shown in FIG. 3.

The controller 108 outputs the buffer write enable signal BWS when the sum of a number of remaining bits from the previous cycle and a number of byte enable signals BES provided during the current cycle is equal to or more than "4". For example, the controller 108 outputs the buffer write enable signal BWS when an initial value of remaining bits from the previous cycle is "0" and a number of byte enable signals BES provided during the current cycle is "4". Therefore, data of the first cycle is written into the data buffer 110.

However, the controller 108 doesn't output the buffer write enable signal BWS when the sum of a number of remaining bits from the previous cycle and a number of byte enable signals BES provided during the current cycle is less than "4". For example, the controller 108 doesn't output the buffer write enable signal BWS when the initial value of remaining bit from the previous cycle is "0" and a number of byte enable signals BES provided during the current cycle is "3". Next, operations after the second cycle will be described.

A beginning-bit byte lane of the first select signal 103 shifts nothing but a number of remaining bits from the previous cycle out of the beginning-bit byte lane of the first select signal 103 at the previous cycle. The beginning-bit byte lane of the first select signal 103 at the second cycle shifts nothing but 4-bit byte lanes out of the beginning-bit byte lane B0 of the first select signal 103 at the first cycle. Specifically, the first select signal 103 at the second cycle shifts nothing but a number of signals of 4-bit byte lanes B4, B5, B6 and B0 at the first cycle. Therefore, the first selector 102 outputs the valid data of 4-bit byte width to 4-bit byte lanes B4, B5, B6 and B0 of the input side of the data register 104, in response to the signals of 4-bit byte lanes B4, B5, B6 and B0 (the first select signal 103). The parenthetic data in Data register [input data] shows the valid data, as shown in FIG. 3.

The beginning-bit byte lane of the enable signal 105 shifts nothing but 4-bit byte lanes when the controller 108 outputs the buffer write enable signal BWS at the previous cycle. That is to say, the beginning-bit byte lane of the enable signal 105 shifts from the bit byte lane B0 to the bit byte lane B4.

When some bit byte lanes remain from the previous cycle, the enable signal 105 is held to be disabled for a corresponding a number of remaining bits from the previous cycle from the bit byte lane B0. In other words, the enable signal 105 is held to be enabled except between the beginning-bit byte lane B4 through the bit byte lane B0. That is to say, the data register 104 outputs and latches the data of the 7-bit byte lane B0–B6. The data of the 7-bit byte lane B0–B6 is shown in Data register [Output data], as shown in FIG. 3.

The beginning-bit byte lane of the second select signal 107 shifts nothing but a number of 4-bit byte lanes when the controller 108 outputs the buffer write enable signal BWS. In the second cycle, the beginning-bit byte lane of the second select signal 107 shifts from the bit byte lane B0 to the bit byte lane B4. Consequently, the second selector 106 selects the 4-bit byte lane B4, B5, B6 and B0 from the 7-bit byte lane B0–B6, and then outputs the data of the 4-bit byte lane B4, B5, B6 and B0 as a valid data. The parenthetic data in Data register [Output data] shows the valid data, as shown in FIG. 3.

The sum of a number of remaining bits from the previous cycle and a number of byte enable signals BES provided during the current cycle is "3", when a number of remaining bits from the previous cycle is "0" and a number of byte enable signals BES provided during the current cycle is "3". As mentioned above, the controller 108 doesn't output the buffer write enable signal BWS, since the sum of a number of remaining bits from the previous cycle and a number of byte enable signals BES provided during the current cycle is less than "4". Therefore, the valid data pass through the second selector 106, however, the valid data is not written into the data buffer 110.

By the way, a final data ("d" and "e") isn't written into the data buffer 110 until the beginning of the next cycle. For example, the beginning of the next cycle can be detected due to a predetermined timeout period between two cycles.

According to the first embodiment of the present invention, since two selectors (first and second selectors 102, 106) which select the valid byte lane are provided at the input and output sides of the data resister 104, the continuity of valid data which is necessary for the operation can be maintained even though the input data includes the valid data and invalid data.

Figure 4:
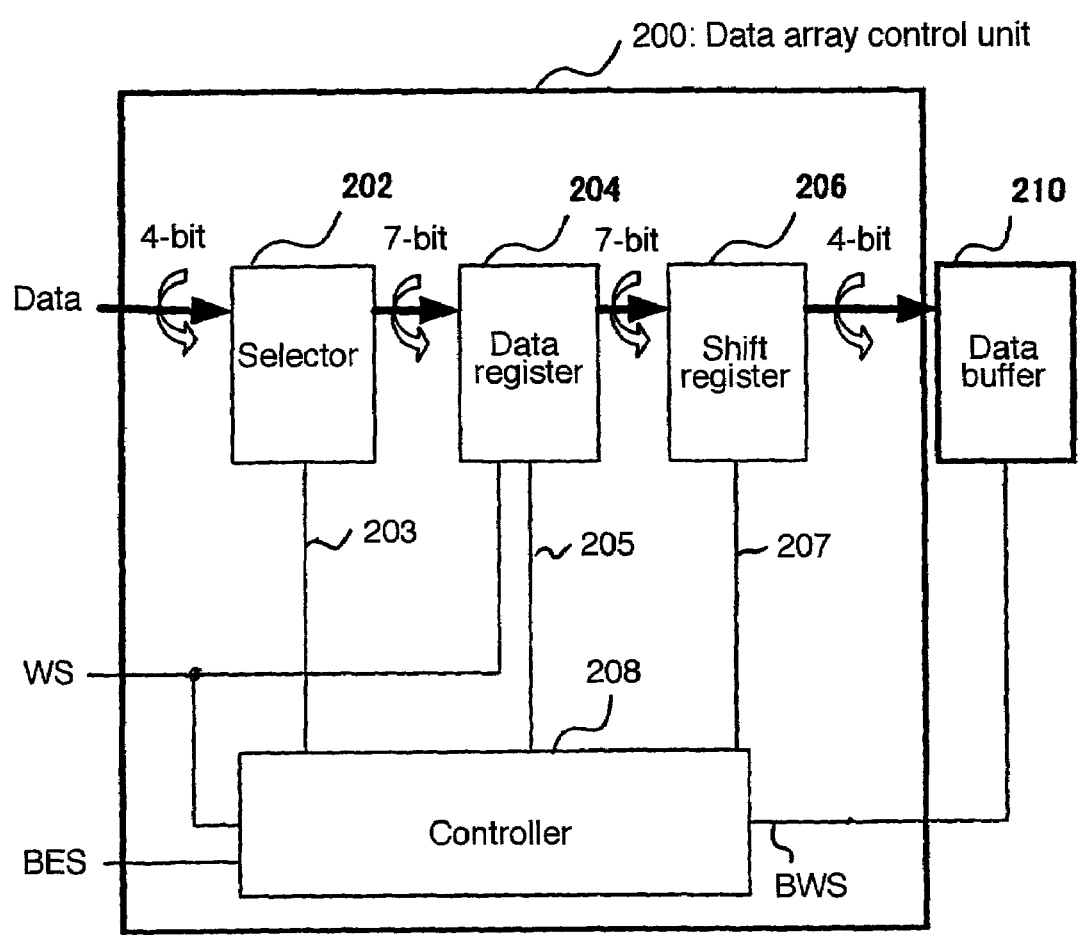
FIG. 4 is a block diagram of a data array control unit according to a second embodiment of the present invention.
Figure 5:
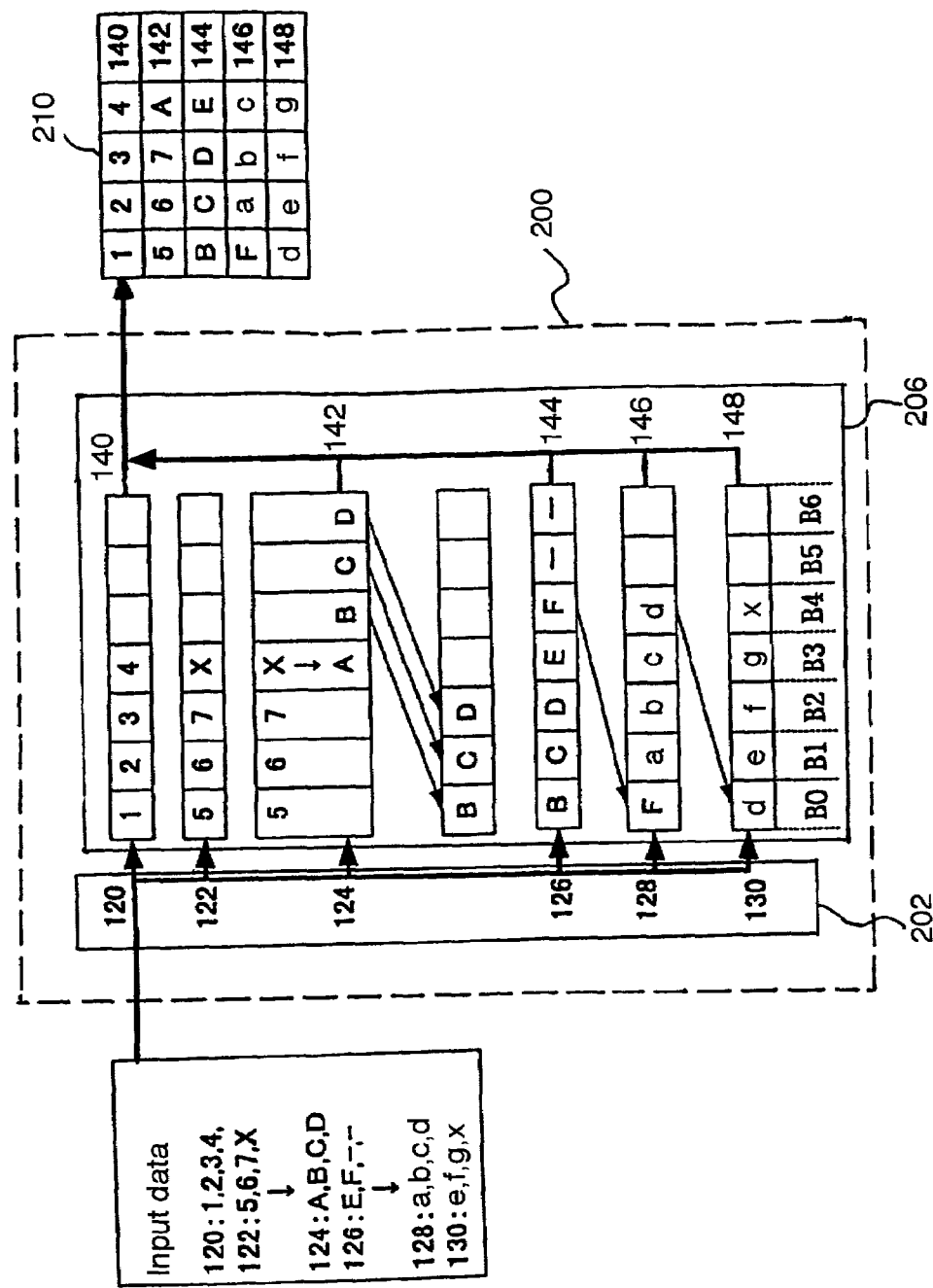
FIG. 5 is an explanation diagram describing the data processing and the data storing when a data bus has a 4-bit byte width, according to the second embodiment of the present invention.

FIG. 4 is a block diagram of a data array control unit 200 according to a second embodiment of the present invention. FIG. 5 is an explanation diagram describing the data processing and the data storing when a data bus has a 4-bit byte width according to the second embodiment of the present invention. In the second embodiment, a data bus is constructed with a 4-bit width, and a data register has a 7-bit byte lane. In the second embodiment, data of the 4-bit byte width is input into the data array control unit 200 as input data 120, 122, 124, 126, 128 and 130 in order.

The data array control unit 200 includes a selector 202, the data register 204, a shift register 206 and a controller 208. The selector 202 is located at an input side of the data register 204, and the shift register 206 is located at an output side of the data register 204, receives an output from the data register 204 and a control signal 207 from the controller 208, and provides an output to the data buffer 210. The data array control unit 200 is connected to a data buffer 210 which has a 4-bit byte lane.

Operation of the data array control unit 200 of FIG. 4 is now described with reference to FIG. 5 and FIG. 6. The input data on the data bus is provided with 4-bit byte width which are shown in FIG. 5 as bytes 120, 122, 124, 126, 128 and 130, as including random data. It is noted that in FIG. 5, "X" is indicative of invalid data and "–" is indicative of no data.

The selector 202 selects a 4-bit byte lane out of the 7-bit byte lane, and provides the 4-bit byte of input data on the selected 4-bit byte lane to the data register 104, in response to a select signal 103 which is output from the controller 208. As shown in FIG. 5, the input data 120 is inputted into bit-byte lanes B0–B3 of the data register 204 which are selected by the selector 202 at a first cycle.

The data register 204 receives the input data, and outputs the input data as is to the shift register 206 in response to the first enable signal 205.

When the received input data fulfills a set data width for outputting, the shift register 206 outputs the input data as is. For example, when the input data 120 is inputted into the shift register 206, the shift register 206 outputs the input data 120 as is. In other words, when the received input data lacks the set data width for outputting, the shift register 206 holds the input data in input order, and then outputs the input data when a bit width of the input data is equal or more than the set data width for outputting. For example, when the input data 122 is inputted into the shift register 206, the shift register 206 holds the input data 122 until the input data 124 at a next cycle is inputted. As a result, since a bit width of the input data is equal or more than the set data width for outputting, the shift register outputs data of the set data width as a valid data.

And, the shift register 206 shifts nothing but a predetermined number of byte lane of a 7-bit byte lane in response to the control signal 207, and then provides the valid data to the data buffer 210. in response to the control signal 207.

An example of how the data from the data bus is provided to data buffer 210 through the data array control unit 200 is further described as follows. In a first or previous cycle, the first 4-bit byte 120 of input data (1, 2, 3, 4), is provided to the selector 202. The selector 202 selects a 4-bit byte lane in order to provide the 4-bit byte 120 to the data register 204. The data register 204 provides the first 4-bit byte 120 of input data (1, 2, 3, 4) as is to the shift register 206. In the first cycle, the input data is provided to the 4-bit byte lane in the shift register 206 consisting of bit locations B0, B1, B2 and B3. Then, the 4 bits of valid data (1, 2, 3, 4) are provided as are to the data buffer because the 4-bit byte 120 of the first cycle includes 4 consecutive valid bits of data.

In the second or next cycle, the second 4-bit byte 122 (5, 6, 7, X), is provided to the selector 202. In this instance, only three valid bits of data are included in the input data byte, wherein the fourth bit is invalid data, represented by "X". The selector 202 selects a 4-bit byte lane which is the same 4-bit byte lane selected during the first cycle. The data register 204 provides the second 4-bit byte 122 (5, 6, 7, X) as is to the shift register 206. The shift register 206 stores the second 4-bit byte 122 (5, 6, 7, X) in input order. Thus, the 4-bits of data are stored in bit locations B0, B1, B2 and B3. Then, only 3-bits of valid data (5, 6, 7) of the second cycle are correctly stored in the shift register 206.

Responsive to the determination that only 3- valid bits of data (5, 6, 7) are stored, the shift register 206 does not provide output to the data buffer 210. The 3-bits of valid data (5, 6, 7) from the current cycle are held as remaining bits. Under control of the controller 208, the third or following cycle is carried out, so that the next 4-bit byte 124 (A, B, C, D) is inputted to the selector 202. As above described, the selector 202 selects a 4-bit byte lane which is located consecutively after the 3-bit byte lane selected during the second cycle. Thus, the 4-bits of data (A, B, C, D) are stored in bit locations B3, B4, B5 and B6. Then, the shift register 206 provides 4 consecutive bits of valid data (5, 6, 7, A) which are stored in bit locations B4, B5, B6 and B0 to the data buffer 210.

The controller 208 has characteristics as follows.

1) It generates the select signal 203 and the enable signal 205, in accordance with a number of remaining bits from the previous cycle.

2) It generates a buffer write enable signal BWS in accordance with a number of remaining bits from the previous cycle and a number of byte enable signals BES provided during the current cycle.

3) It generates the control signal 207 in accordance with logic states of the buffer write enable signal BINS provided during the current cycle which shows valid and invalid states of the buffer write enable signal BWS, and a number of the remained byte lane at the previous cycle.

Figure 6:
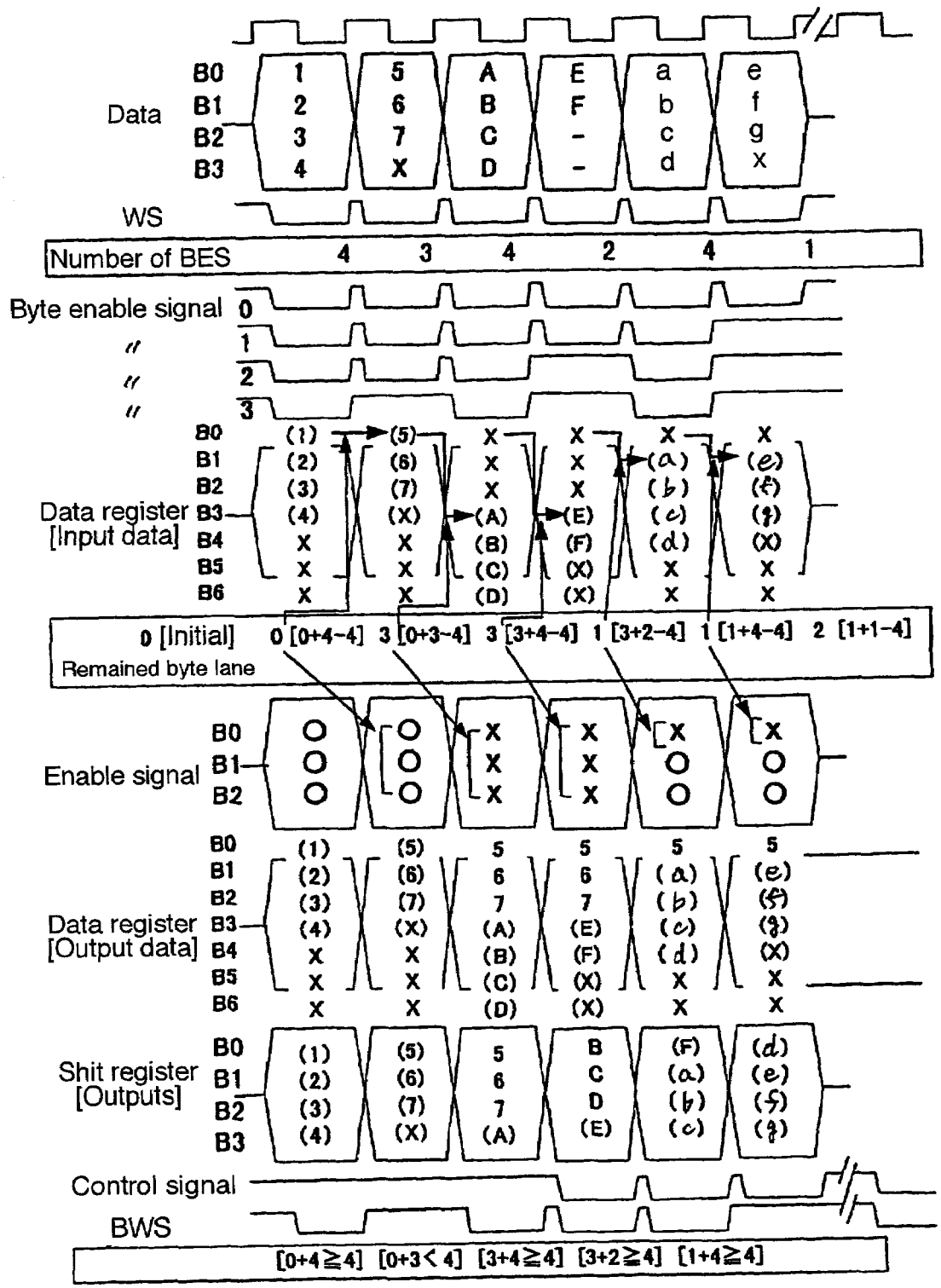
FIG. 6 is an explanation diagram describing a data array timing according to the second embodiment of the present invention.

FIG. 6 is an explanation diagram describing a data array timing according to the second embodiment of the present invention.

The selector 202 outputs the input data of the 4-bit byte width to the bit locations B0, B1, B2 and B3 as a valid data, in response to initial values B0, B1, B2 and B3 of the select signal 203. The parenthetic data in Data register [Input Data] shows the input data of the 4-bit byte width as the valid data, as shown in FIG. 6.

The data register 204 outputs and latches the data of the 7-bit byte lane B0–B6 in response to initial values B0–B6 of the enable signal 205. The data of the 7-bit byte lane B0–B6 is shown as Data register [Output data] in FIG. 6.

The shift register 206 outputs data of the 4-bit byte lane B0, B1, B2 and B3 as a valid data without shifting, in response to an initial value 0 of the remained byte lane. The data of the 4-bit byte lane B0–B3 is shown as Shift register [Outputs] in FIG. 6.

The controller 208 outputs the buffer write enable signal BWS when the sum of a number remaining bits from the previous cycle and a number of byte enable signals BES provided during the current cycle is equal to or more than "4". For example, the controller 208 output the buffer write enable signal BWS when an initial value of remaining bits from the previous cycle is "0" and a number of byte enable signals BES provided during the current cycle is "4". Therefore, data of the first cycle is written into the data buffer 210.

However, the controller 208 doesn't output the buffer write enable signal BWS when the sum of a number of remaining from the previous cycle and a number of byte enable signals BES provided during the current cycle is less than "4". For example, the controller 208 doesn't output the buffer write enable signal BWS when the initial value of remaining bits from the previous cycle is "0" and a number of byte enable signals BES provided during the current cycle is "3". Next, operations after the second cycle will be described.

A beginning-bit byte lane of the select signal 203 shifts nothing but a number of remaining bits from the previous cycle out of the beginning-byte lane of the select signal 203 at the previous cycle. The beginning-bit byte lane of the select signal 203 at the second cycle doesn't shift out of the beginning-bit byte lane of the select signal 203 at the first cycle, since a number of remaining from the previous cycle is "0". Specifically, the select signal 203 at the second cycle shifts nothing but a number of signals of the 4-bit byte lane B0, B1, B2 and B3 at the first cycle. Therefore, the selector 202 outputs the valid data of 4-bit byte width to 4-bit byte lanes B0, B1, B2 and B3 of the data register 204, in response to the signals of 4-bit byte lanes B0, B1, B2 and B3 (the select signal 203). The parenthetic data in Data register [Input data] shows the valid data, as shown in FIG. 6.

The enable signal 205 holds to be disable for corresponding to a number of remaining from the previous cycle from the bit byte lane B0. In other words, the enable signal 205 holds to be enable without between the bit byte lane B0 through a number of remaining from the previous cycle. That is to say, the data register 204 outputs and latches the data of the 7-bit byte lanes B0–B6. The data of the 7-bit byte lanes B0–B6 is shown in Data register [Output data], as shown in FIG. 6.

The control signal 207 shifts nothing but a number of 4-bit byte lanes when the controller 208 outputs the buffer write enable signal BWS and some bit byte lanes remaining from the previous cycle. For example, the bit byte lane B4 shifts to the bit byte lane B0, the bit byte lane B5 shifts to the bit byte lane B1, and also the bit byte lane B6 shifts to the bit byte lane B2, respectively. However, the control signal 207 doesn't shift when the controller 208 doesn't output the write enable signal WES or some bit byte lanes doesn't remain from the previous cycle. Consequently, the shift register 206 outputs the data of the 4-bit byte lanes B0–B3 as a valid data without shifting the 4-bit byte lanes B0–B3. The data of the 4-bit bite lanes B0–B3 is shown in Shift register [Output data], as shown in FIG. 6.

The sum of a number of remaining from the previous cycle and a number of byte enable signals BES provided during the current cycle is "3", when a number of remaining bits from the previous cycle is "0" and a number of byte enable signals BES provided during the current cycle is "3". As mentioned above, the controller 208 doesn't output the write enable signal WES, since the sum of a number of remaining bits from the previous cycle and a number of byte enable signals BES provided during the current cycle is less than "4". Therefore, the valid data pass through the shift register 206, however, the valid data isn't written into the data buffer 210.

By the way, a final data ("d" and "e") isn't written into the data buffer 210 until the beginning of the next cycle. For example, the beginning of the next cycle can be detected due to a predetermined timeout period between two cycles.

According to the second embodiment of the present invention, since the selector 202 which select the valid byte lane is provided at the input side of the data register 204, and the shift register 206 which shifts the valid byte lane to the 4-bit byte lanes is provided at the output side of the data register 204, when the data register has 7-bit byte lanes, the continuity of valid data which is necessary for the operation can be maintained even though the input data includes the valid data and invalid data.

Figure 7:
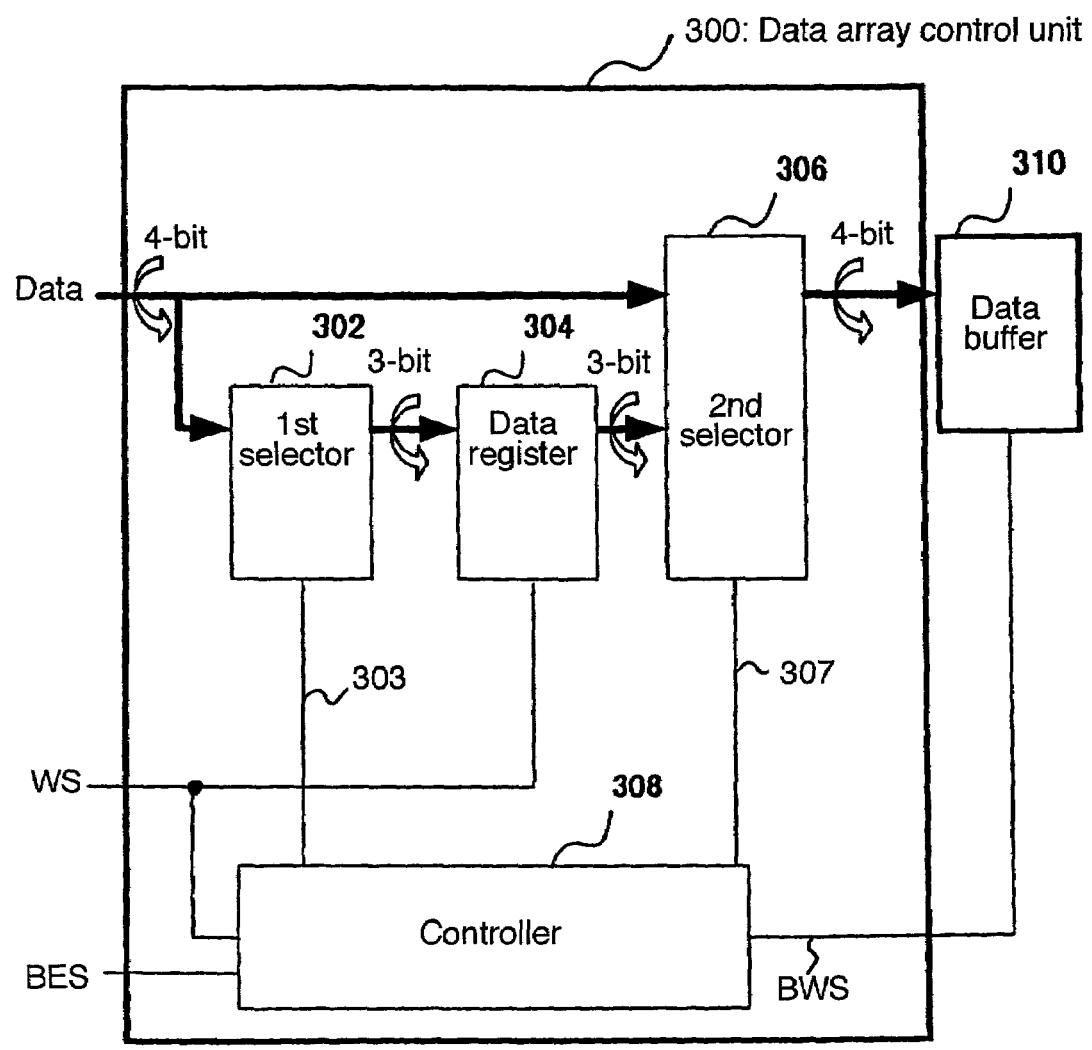
FIG. 7 is a block diagram of a data array control unit according to a third embodiment of the present invention.
Figure 8:
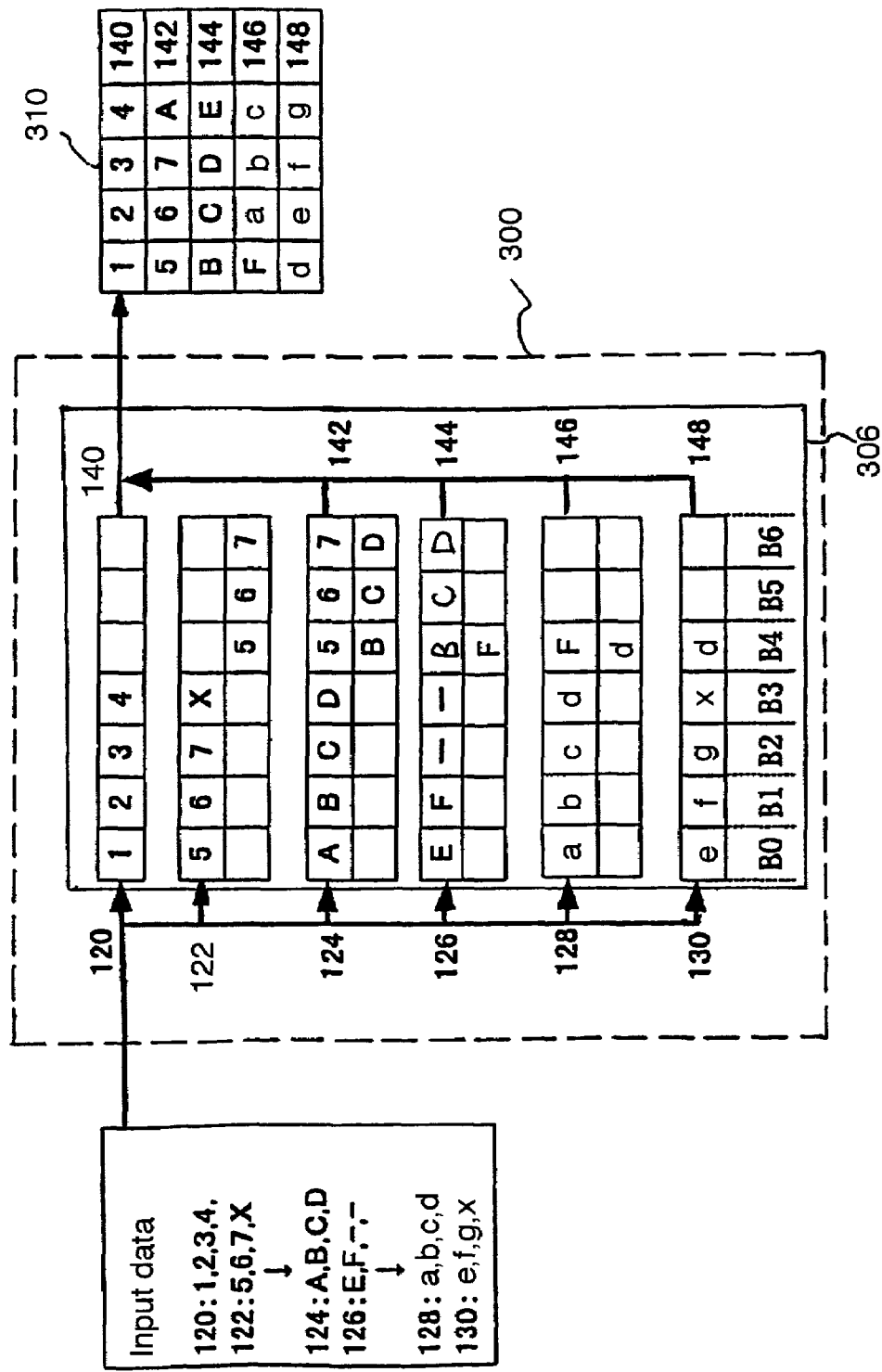
FIG. 8 is an explanation diagram describing the data processing and the data storing when a data bus has a 4-bit byte width, according to the third embodiment of the present invention.

FIG. 7 is a block diagram of a data array control unit 300 according to a third embodiment of the present invention. FIG. 8 is an explanation diagram describing the data processing and the data storing when a data bus has a 4-bit byte width according to the third embodiment of the present invention. In the third embodiment, a data bus is constructed with a 4-bit width, and a data register has a 3-bit byte lane. In the third embodiment, data of the 4-bit byte width is input into the data array control unit 300 as input data 120, 122, 124, 126, 128 and 130 in order.

The data array control unit 300 includes a first selector 302, a data register 304, a second selector 306 and a controller 308. The first selector 302 is located at an input side of the data register 304, and the second selector 306 is located at an output side of the data register 304. The data array control unit 300 connects to a data buffer 310 which has a 4-bit byte lane.

Operation of the data array control unit 300 of FIG. 7 is now described with reference to FIG. 8 and FIG. 9. The input data on the data bus is provided with 4-bit width which are shown in FIG. 7 as bytes 120, 122, 124, 126, 128 and 130, as including random data. It is noted that in FIG. 7, "X" is indicative of invalid data and "–" is indicative of no data.

The first selector 302 selects a 3-bit byte lane from the 4-bit byte lane of the data bus, in response to a first select signal 303 which is output from the controller 308.

The data register 304 holds the input data when the input data lacks a set data width for outputting, and outputs the input data during a next cycle. For example, when the input data 122 is inputted into the data register 304, the data register holds the input data 122 and outputs the input data 122 during the next cycle.

The second selector 306 selects a 4-bit byte lane out of the 7-bit byte lane provided by the data bus and the data register 304, in response to a second byte select signal 307.

An example of how the data from the data bus is provided to data buffer 310 through the data array control unit 300 is further described as follows. In a first or previous cycle, the first 4-bit byte 120 of input data (1, 2, 3, 4), is provided to the first selector 302 and the second selector 306. The first selector 302 selects a 3-bit byte lane B0, B1 and B2 to provide the 4-bit byte 120 to the data register 304 in response to a first select signal 303. The data register 304 holds only 3-bits data (1, 2, 3) of the first 4-bit byte of input data 120 (1, 2, 3, 4). In the first cycle, the data register 304 doesn't provide the input data to the second selector 306. Therefore, the second selector 306 outputs the first 4-bit byte 120 of input data (1, 2, 3, 4) which is received from the data bus, in response to a second select signal 307. The data buffer 310 receives and stores the first 4-bit byte 120 of input data (1, 2, 3, 4) which is an output from the second selector 306 in response to a buffer write enable signal BWS.

In the second or next cycle, the data register 304 outputs the input data (1, 2, 3) during the first cycle to the second selector 306. The second 4-bit byte 122 of input data (5, 6, 7, X), is provided to the first selector 302 and the second selector 306. In this instance, only three valid bits of data are included in the input data byte, wherein the fourth bit is invalid data, represented by "X". The first selector 302 selects a 3-bit byte lane B0, B1 and B2. The data register 304 holds only 3-bits data (5, 6, 7) of the second 4-bit byte 122 (5, 6, 7, X). In the second cycle, the second selector 306 doesn't provide any data to the data buffer because 3-bits data (5, 6, 7) during the second cycle lacks the set data width for outputting.

Responsive to the determination that only 3 valid bits of data (5, 6, 7) are stored, the second selector 306 does not provide output to the data buffer 310. The 3-bits of valid data (5, 6, 7) from the current cycle are held as remaining bits. Under control of the controller 308, the third or following cycle is carried out, so that the next 4-bit byte 124 (A, B, C, D) is inputted to the first selector 302 and the second selector 306. As above described, the first selector 302 selects a 3-bit byte lane B0, B1 and B2 in response to the first select signal 303. The data register 304 outputs the input data (5, 6, 7) during the second cycle to the second selector 306, and holds only 3-bits data (B, C, D) of the third 4-bit byte 124 (A, B, C, D). Then, the second selector 306 provides 4 consecutive bits of valid data (5, 6, 7, A) to the data buffer 310 in response to the second select signal.

The controller 308 has characteristics as follows.

1) It generates the first select signal 303 and the buffer write enable signal BWS, in accordance with a number of remaining bits from the previous cycle and a number of byte enable signals BES provided during the current cycle.

2) It generates the second select signal 307 in accordance with a number of remaining bits from the previous cycle, a number of byte enable signals BES and logic states of the buffer write enable signal BWS provided during the current cycle. The logic states shows valid and invalid states of the buffer write enable signal BWS.

Figure 9:
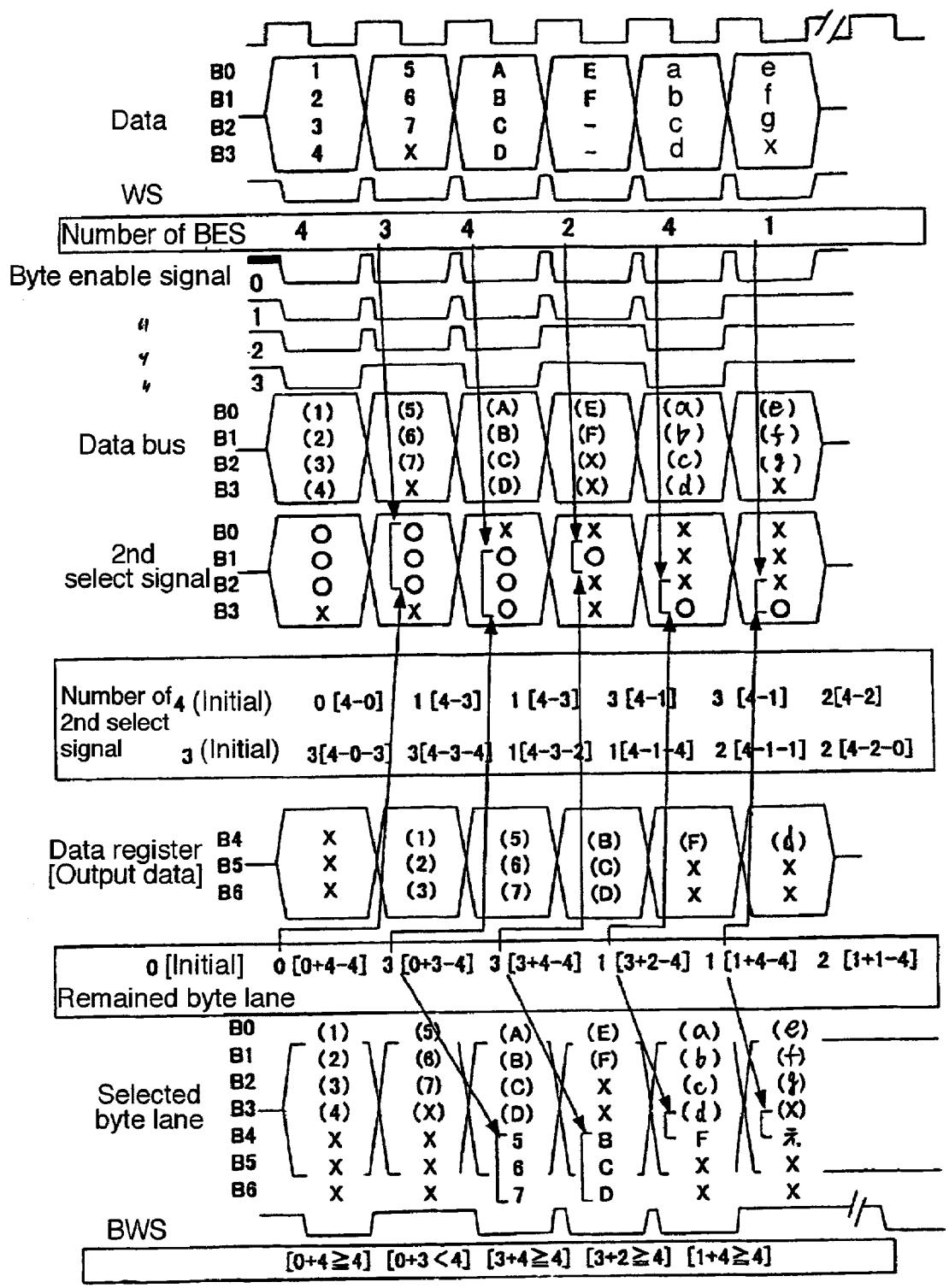
FIG. 9 is an explanation diagram describing a data array timing according to the third embodiment of the present invention.

FIG. 9 is an explanation diagram describing a data array timing according to the third embodiment of the present invention.

The first selector 302 outputs the input data of the bit locations B0, B1 and B2 as a valid data, in response to initial values B0, B1 and B2 of the first select signal 303.

The data register 304 latches the data of the 3-bit byte lane and then outputs them during a next cycle, in response to the write enable signal WS. The data of the 3-bit byte lane is shown as Data register [Output data] in FIG. 9.

The second selector 306 selects a 4-bit byte lane B0–B3 out of the 7-bit byte lane B0–B6 and outputs data of the 4-bit byte lane B0–B3 as a valid data, in response to initial values B0, B1 and B2 of the second select signal 307.

The controller 308 outputs the buffer write enable signal BWS when the sum of a number of remaining bits from the previous cycle and a number of byte enable signals BES provided during the current cycle is equal to or more than "4". For example, the controller 308 outputs the buffer write enable signal BWS when an initial value of remaining bits from the previous cycle is "0" and a number of byte enable signals BES provided during the current cycle is "4". Therefore, data of the first cycle is written into the data buffer 310.

However, the controller 308 doesn't output the buffer write enable signal BWS when the sum of a number of remaining bits from the previous cycle and a number of byte enable signals BES provided during the present cycle is less than "4". For example, the controller 308 doesn't output the buffer write enable signal BWS when an initial value of remaining bits from the previous cycle is "0" and a number of byte enable signals BES provided during the current cycle is "3". Next, operations after the second cycle will be described.

A beginning-bit byte lane of the first select signal 303 shifts nothing but a reminder which subtracts a number of remaining bits from the previous cycle from "4", out of the beginning-bit byte lane of the first select signal 303 at the previous cycle. Concretely, the beginning-bit byte lane of the first select signal 303 at the second cycle doesn't shift out of the beginning-bit byte lane of the first select signal 303 at the first cycle, since a number of remaining bits from the previous cycle is "0". A number of bit byte lanes at the second cycle is decided by the reminder which subtracts a number "0" of remaining bits from the first cycle and a number "3" of byte enable signals BES provided during the second cycle from "4". Therefore, the first selector 302 outputs data of 3-bit byte lanes B0, B1 and B2 as a valid data.

The data register 304 outputs the data which is held in response to the write enable signal WS during the previous cycle, in response to the write enable signal WS at the current cycle. The data is shown as Data register [Output data] in FIG. 9.

The second select signal 307 selects an output from the data register 304 nothing but a number of remaining bits from the previous cycle, and an outside input data nothing but a reminder which subtracts a number of remaining bits from the previous cycle from "4". The selected byte lane is shown as Selected byte lane in FIG. 9.

The sum of a number of remaining bits from the previous cycle and a number of byte enable signals BES provided during the current cycle is "3", when a number of remaining bits from the previous cycle is "0" and a number of byte enable signals BES provided during the current cycle is "3". As mentioned above, the controller 308 doesn't output the buffer write enable signal BWS, since the sum of a number of remaining bits from the previous cycle and a number of byte enable signals BES provided during the current cycle is less than "4". Therefore, the valid data pass through the second selector 306, however, the valid data isn't written into the data buffer 310.

By the way, a final data ("d" and "e") isn't written into the data buffer until the beginning of the next cycle. For example, the beginning of the next cycle can be detected due to a predetermined timeout period between two cycles.

According to the third embodiment of the present invention, since two selectors (first and second selectors 302, 306) which selects the valid byte lane are provided at the input and output sides of the data register 304, the continuity of valid data which is necessary for the operation can be maintained even though the input data includes the valid data and invalid data.

Figure 10:
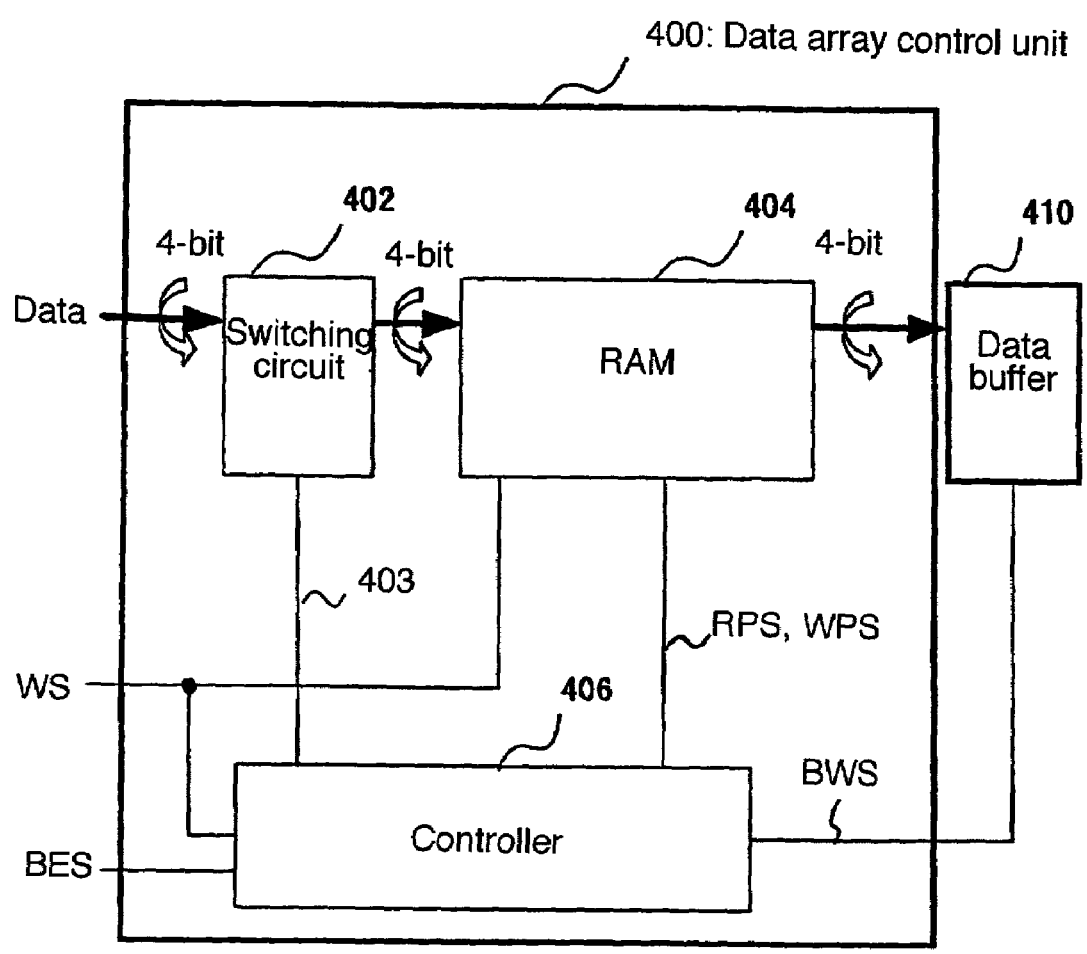
FIG. 10 is a block diagram of a data array control unit according to a fourth embodiment of the present invention.

FIG. 10 is a block diagram of a data array control unit 400 according to a fourth embodiment of the present invention. FIG. 11 is an explanation diagram describing the data processing and the data storing when a data bus has a 4-bit byte width according to the fourth embodiment of the present invention. In the fourth embodiment, a data bus is constructed with a 4-bit byte width. In the fourth embodiment, data of the 4-bit byte width is input into the data array control unit 400 as input data 120, 122, 124, 126, 128 and 130 in order.

A data array control unit 400 includes a selector 402, a memory 404 and controller 406. The memory 404 is constructed with four RAM (Random Access Memory) of a 8-bit byte width. The data array control unit 400 connects to a data buffer 410 which has a 4-bit byte lane.

Reference number 402 denotes a switching circuit, for example a multiplexer, which switches an order of the bits of the parallel 4-bit byte input data, in response to a control signal 403.

The memory 404 holds the input data when the input data lacks a set data width for outputting in response to a write point signal WPS. Next, the memory 404 receives the input signal of a next cycle, and then outputs data which fulfills the set data width for outputting to the data buffer 410 in response to a read point signal RPS. In more detail, the memory 404 outputs data from a line which is assigned by the read point signal RPS, and holds the data to a point which is assigned by the write point signal WPS in response to a write signal WS.

An example of how the data from the data bus is provided to data buffer 410 through the data array control unit 400 is further described as follows. In a first or previous cycle, the first 4-bit byte 120 of input data (1, 2, 3, 4), is provided to the switching circuit 402. The switching circuit 402 switches an order of the bits of the parallel 4-bit byte input data to provide the first 4-bit byte 120 of input data (1, 2, 3, 4) to the memory 404 in response to a control signal 403. The memory 404 holds the first 4-bit byte of input data 120 (1, 2, 3, 4) to a point which is assigned by the write point signal WPS. And, the memory 304 outputs the input data 120 to the data buffer 410 from a line which is assigned by the read point signal RPS. The data buffer 410 receives and stores the first 4-bit byte 120 of input data (1, 2, 3, 4) which is an output from the memory 404 in response to a buffer write enable signal BWS.

In the second or next cycle, the second 4-bit byte 122 of input data (5, 6, 7, X) is provided to the switching circuit 402. In this instance, only three valid bits of data are included in the input data byte, wherein the fourth bit is invalid data, represented by "X". The switching circuit 402 switches an order of the bits of the parallel 4-bit byte input data to provide the first 4-bit byte 122 of input data (5, 6, 7, X). The memory 404 holds only 3-bits data (5, 6, 7) of the second 4-bit byte 122 (5, 6, 7, X). In the second cycle, the memory 404 doesn't provide any data to the data buffer 410 because 3-bits data (5, 6, 7) during the second cycle lacks the set data width for outputting.

Responsive to the determination that only 3 valid bits of data (5, 6, 7) are stored, the memory 404 does not provide output to the data buffer 410. The 3-bits of valid data (5, 6, 7) from the current cycle are held as remaining bits. Under control of the controller 408, the third or following cycle is carried out, so that the next 4-bit byte 124 (A, B, C, D) is inputted to the switching circuit 402. As above described, the switching circuit 402 switches an order of the bits of the parallel 4-bit byte input data to provide the first 4-bit byte 124 of input data (A, B, C, D) in response to the control signal 403. The memory 404 holds the first 4-bit byte 124 of input data (A, B, C, D) to a point which is assigned by the write point signal WPS, and outputs 4 consecutive bits of valid data (5, 6, 7, A) from a line which is assigned by the read point signal RPS to the data buffer 410.

The controller 408 has characteristics as follows.

1) It generates a buffer write enable signal BWS and the read point signal RPS, in accordance with a number of remaining bits from the previous cycle and a number of byte enable signals BES provided during the current cycle.

2) It generates the write point signal WPS in accordance with the write point of the previous cycle and a number of byte enable signals BES provided during the current cycle.

Figure 12:
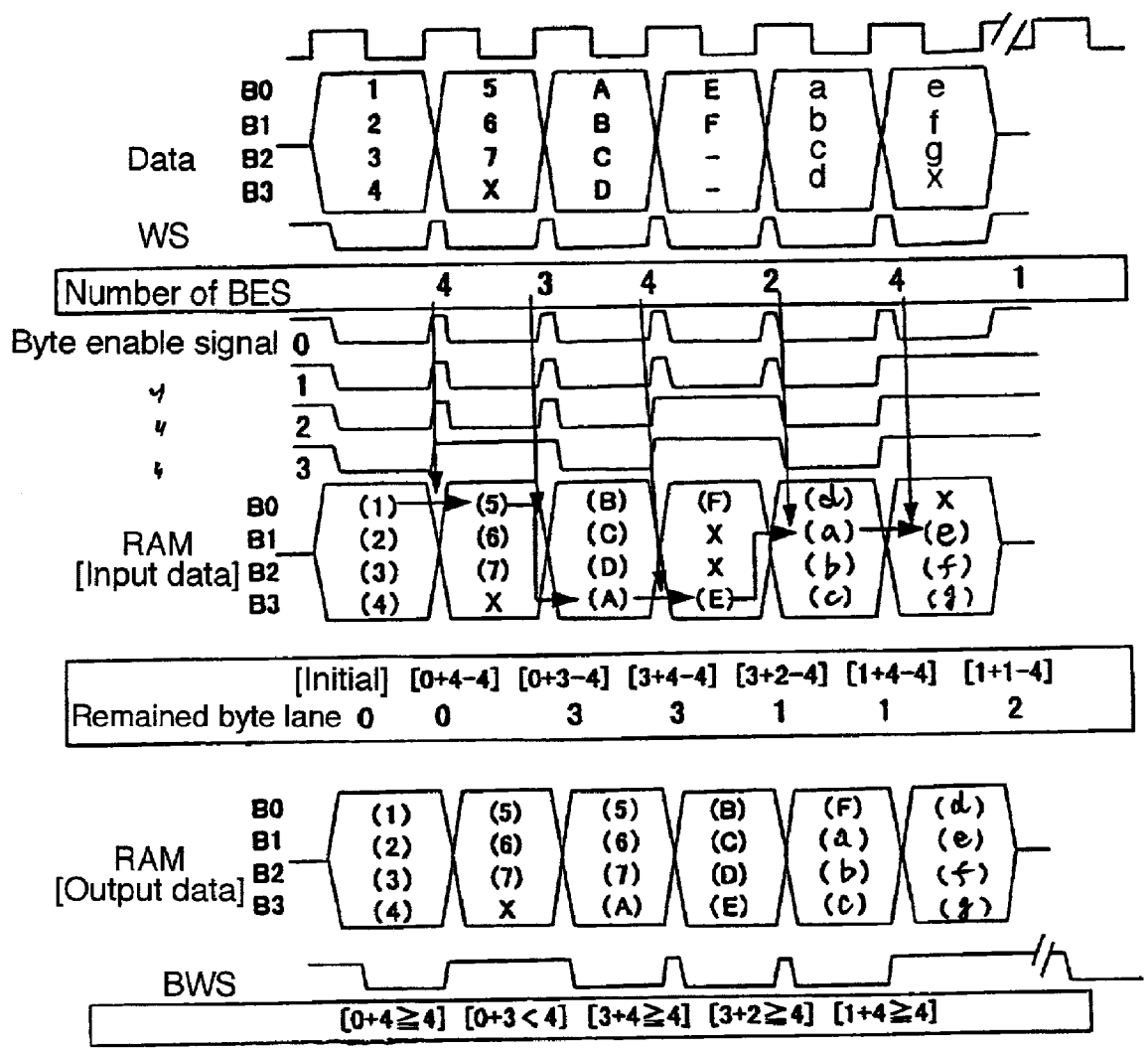
FIG. 12 is an explanation diagram describing a data array timing according to the fourth embodiment of the present invention.
Figure 13:
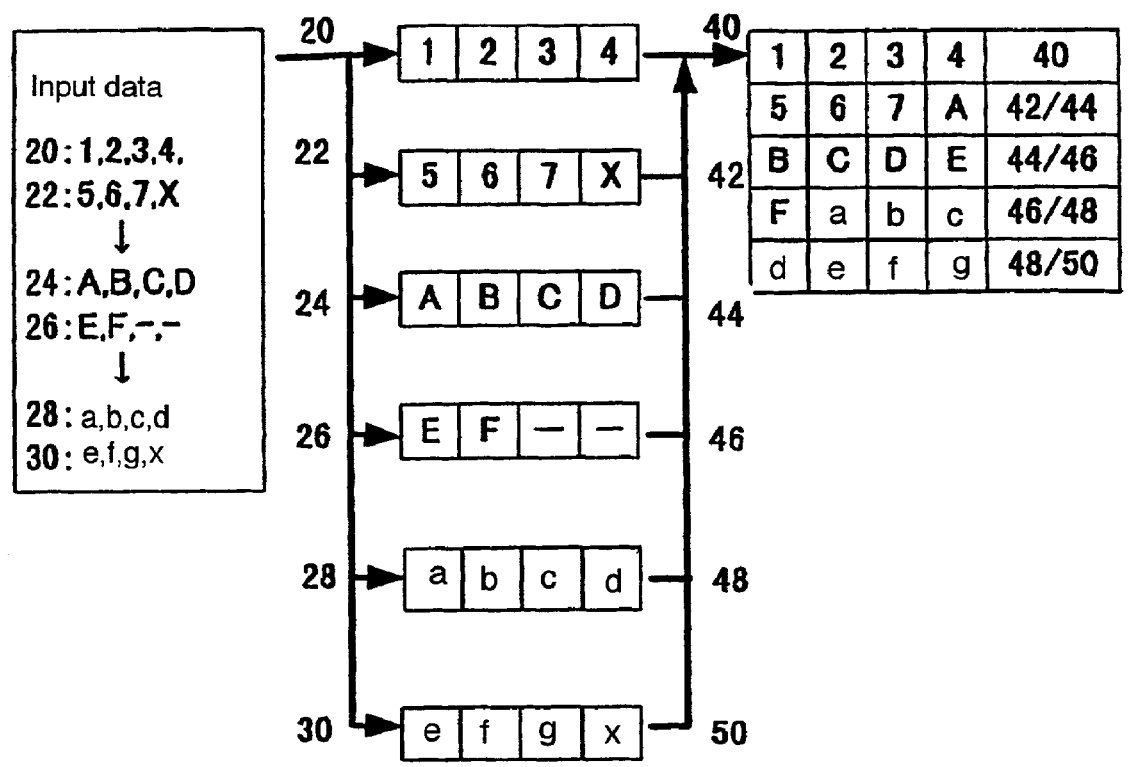
FIG. 13 is an explanation diagram describing conventional data processing and data storing.

FIG. 12 is an explanation diagram describing a data array timing according to the fourth embodiment of the present invention.

The switching circuit 402 switches a bit order of the input data of the input side 4-bit byte lane B0, B1, B2 and B3, and outputs them to the output side 4-bit byte lane B0, B1, B2 and B3 as a valid data, in response to an initial value B0 of the select signal 403. The data of the 4-bit byte lane is shown as Memory [Input data] in FIG. 12.

The memory 404 holds the data of the 4-bit byte width in response to the initial value (lane B0 of the first line) of the write point signal WPS, and then outputs the data of the 4-bit byte width in response to the initial value (the first line) of the read point signal RPS. The data of the 4-bit byte width is shown as Memory [Output data] in FIG. 12.

The controller 406 outputs the buffer write enable signal BWS and changes the read point to the next line, when the sum of a number of remaining bits from the previous cycle and a number of byte enable signals provided during the current cycle is equal to or more than "4".

However, the controller 406 doesn't output the buffer write enable signal BWS when the sum of a number of remaining bits from the previous cycle and a number of byte enable signals provided during the current cycle is less than "4". At this point, the read point doesn't change, too.

The write point signal WPS shifts nothing but a number of byte enable signals BES.

The controller 408 changes the read point to the next line and then outputs the buffer write enable signal BWS, since the sum of a number of remaining bits from the previous cycle and a number of byte enable signals provided during the present cycle is equal to or more than "4" when the initial value of remaining bits is "0" and a number of byte enable signals BES provided during the first cycle is "4". As a result, the data of the 4-bit byte width at the first cycle is written into the data buffer 410. Next, operations after the second cycle will be described.

A beginning-bit byte lane of the control signal 403 shifts nothing but a number of byte enable signals BES provided during the previous cycle out of the beginning-bit byte lane of the control signal 403 at the previous cycle. For example, the control signal 403 at the second cycle shifts nothing but a number (4) of byte enable signals BES during the first cycle. Therefore, the switching circuit 402 outputs data of the input side 4-bit byte lane B0–B3 to the output side 4-bit byte lane B0–B3.

In the second cycle, the controller 406 doesn't change the read point and output the buffer write enable signal BWS, since a number of remaining bits from the first cycle is "0", a number of byte enable signals BES provided during the present cycle is "3" and the sum of the both is less than "4". The write point signal WPS at the second cycle shifts nothing but a number (3) of byte enable signals BES.

By the way, a final data ("d" and "e") isn't written into the data buffer until the beginning of the next cycle. For example, the beginning of the next cycle can be detected due to a predetermined timeout period between two cycles.

According to the fourth embodiment of the present invention, since the memory 404 which is constructed with four RAM of the 8-bit byte width and the switching circuit 402 which is located at the input side of the memory 404 are provided, the continuity of valid data which is necessary for the operation can be maintained even though the input data includes the valid data and invalid data.

As described above, in the system for controlling a data transfer and the method of the same according to the present invention, the continuity of valid data which is necessary for the operation can maintain, without using enable signals which indicate the predetermined bit byte width of the valid data bus, and without using data processing using software, even though receiving apparatus receives data through a data bus which has an optional bit byte width.

The present invention has been described with reference to illustrative embodiments, however, this description must not be considered to be confined only to the embodiments illustrated. Various modifications and changes of these illustrative embodiments and the other embodiments of the present invention will become apparent to one skilled in the art from reference to the description of the present invention. It is therefore contemplated that the appended claims will cover any such modifications or embodiments as fall within the true scope of the invention.

What is claimed is:

1. A system for controlling data transfer, comprising:
a data bus which has an n-bit byte width and passes an input data;
a data register which has a (2n−1)-bit byte lane and receives the input data, wherein the data register outputs the input data as is when the input data fulfills a set data width for outputting, and holds the input data until a bit width of the input data is equal to or more than the set data width when the input data lacks the set data width, in response to a first enable signal;

a first selector which is located at an input side of the data resister and selects an n-bit byte lane from the (2n−1)-bit byte lane of the data register in response to a first select signal;

a second selector which is located at an output side of the data resister and selects an n-bit byte lane out of a (2n−1)-bit byte lane and outputs a valid data in response to a second select signal;

a data buffer which has an n-bit byte lane, wherein the data buffer receives and stores the valid data in response to a second enable signal; and a controller which generates the first and second select signals, and the first and second enable signals;

wherein the controller generates the first select signal in accordance with a number of byte enable signals provided during a previous cycle.

2. A system for controlling data transfer, comprising:

a data bus which has an n-bit byte width and passes an input data;

a data register which has a (2n−1)-bit byte lane and receives the input data, wherein the data register outputs the input data as is when the input data fulfills a set data width for outputting, and holds the input data until a bit width of the input data is equal to or more than the set data width when the input data lacks the set data width, in response to a first enable signal;

a first selector which is located at an input side of the data resister and selects an n-bit byte lane from the (2n−1)-bit byte lane of the data register in response to a first select signal;

a second selector which is located at an output side of the data resister and selects an n-bit byte lane out of a (2n−1)-bit byte lane and outputs a valid data in response to a second select signal;

a data buffer which has an n-bit byte lane, wherein the data buffer receives and stores the valid data in response to a second enable signal; and a controller which generates the first and second select signals, and the first and second enable signals;

wherein the controller generates the second select signal in accordance with logic states of a write enable signal which shows valid and invalid states.

3. A system for controlling data transfer, comprising:

a data bus which has an n-bit byte width and passes an input data;

a data register which has a (2n−1)-bit byte lane and receives the input data, wherein the data register outputs the input data as is when the input data fulfills a set data width for outputting, and holds the input data until a bit width of the input data is equal to or more than the set data width when the input data lacks the set data width, in response to a first enable signal;

a first selector which is located at an input side of the data resister and selects an n-bit byte lane from the (2n−1)-bit byte lane of the data register in response to a first select signal;

a second selector which is located at an output side of the data resister and selects an n-bit byte lane out of a (2n−1)-bit byte lane and outputs a valid data in response to a second select signal;

a data buffer which has an n-bit byte lane, wherein the data buffer receives and stores the valid data in response to a second enable signal; and a controller which generates the first and second select signals, and the first and second enable signals;

wherein the controller generates the first enable signal in accordance with a number of remaining bits from a previous cycle, a number of byte enable signals provided during a current cycle and logic states of the second enable signal provided during the current cycle.

4. A system for controlling data transfer, comprising:

a data bus which has an n-bit byte width and passes an input data;

a data register which has a (2n−1)-bit byte lane and receives the input data, wherein the data register outputs the input data as is when the input data fulfills a set data width for outputting, and holds the input data until a bit width of the input data is equal to or more than the set data width when the input data lacks the set data width, in response to a first enable signal;

a first selector which is located at an input side of the data resister and selects an n-bit byte lane from the (2n−1)-bit byte lane of the data register in response to a first select signal;

a second selector which is located at an output side of the data resister and selects an n-bit byte lane out of a (2n−1)-bit byte lane and outputs a valid data in response to a second select signal;

a data buffer which has an n-bit byte lane, wherein the data buffer receives and stores the valid data in response to a second enable signal; and a controller which generates the first and second select signals, and the first and second enable signals;

wherein the controller generates the second enable signal in accordance with a number of remaining bits from a previous cycle and a number of byte enable signals provided during a current cycle.

5. The system for controlling data transfer according to claim 1, wherein the set data width is n-bits.

6. A system for controlling data transfer, comprising:

a data bus which has an n-bit byte width and passes an input data;

a data register which has a (2n−1)-bit byte lane, wherein the data register receives the input data and outputs the input data as is in response to a first enable signal;

a selector which is located at an input side of the data resister and selects an n-bit byte lane from the (2n−1)-bit byte lane of the data register in response to a select signal;

a shift register which is located in an output side of the data resister, wherein the shift register holds the input data in input order when the input data lacks a set data width for outputting, outputs the input data when a bit width of the input data is equal to or more than the set data width, and shifts nothing but a predetermined number of byte lane of a (2n−1)-bit byte lane in response to a control signal;

a data buffer which has an n-bit byte lanes, wherein the data buffer receives and stores output of the register and the shift register in response to a second enable signal; and a controller which generates the select signal, the control signal, and the first and second enable signals;

wherein the controller generates the select signal and the first enable signal in accordance with a number of remaining bits from a previous cycle.

7. A system for controlling data transfer, comprising:

a data bus which has an n-bit byte width and passes an input data;

a data register which has a (2n−1)-bit byte lane, wherein the data register receives the input data and outputs the input data as is in response to a first enable signal;

a selector which is located at an input side of the data resister and selects an n-bit byte lane from the (2n–1)-bit byte lane of the data register in response to a select signal;

a shift register which is located in an output side of the data resister, wherein the shift register holds the input data in input order when the input data lacks a set data width for outputting, outputs the input data when a bit width of the input data is equal to or more than the set data width, and shifts nothing but a predetermined number of byte lane of a (2n–1)-bit byte lane in response to a control signal;

a data buffer which has an n-bit byte lanes, wherein the data buffer receives and stores output of the register and the shift register in response to a second enable signal; and a controller which generates the select signal, the control signal, and the first and second enable signals;

wherein the controller generates the second enable signal in accordance with a number of remaining from a previous cycle and a number of byte enable signals provided during a current cycle.

8. A system for controlling data transfer, comprising:

a data bus which has an n-bit byte width and passes an input data;

a data register which has a (2n–1)-bit byte lane, wherein the data register receives the input data and outputs the input data as is in response to a first enable signal;

a selector which is located at an input side of the data resister and selects an n-bit byte lane from the (2n–1)-bit byte lane of the data register in response to a select signal;

a shift register which is located in an output side of the data resister, wherein the shift register holds the input data in input order when the input data lacks a set data width for outputting, outputs the input data when a bit width of the input data is equal to or more than the set data width, and shifts nothing but a predetermined number of byte lane of a (2n–1)-bit byte lane in response to a control signal;

a data buffer which has an n-bit byte lanes, wherein the data buffer receives and stores output of the register and the shift register in response to a second enable signal; and a controller which generates the select signal, the control signal, and the first and second enable signals;

wherein the controller generates the control signal in accordance with a number of remaining bits from a previous cycle and logic states of the second enable signal provided during a current cycle which shows valid and invalid states.

9. The system for controlling data transfer according to claim 6, wherein the set data width is n-bits.

10. A system for controlling data transfer, comprising:

a data bus which has an n-bit byte width and passes an input data;

a data register which has a (2n–1)-bit byte lane, wherein the data register receives the input data and outputs the input data as is in response to a first enable signal;

a selector which is located at an input side of the data resister and selects an n-bit byte lane from the (2n–1)-bit byte lane of the data register in response to a select signal;

a shift register which is located in an output side of the data resister, wherein the shift register holds the input data in input order when the input data lacks a set data width for outputting, outputs the input data when a bit width of the input data is equal to or more than the set data width, and shifts nothing but a predetermined number of byte lane of a (2n–1)-bit byte lane in response to a control signal;

a data buffer which has an n-bit byte lanes, wherein the data buffer receives and stores output of the register and the shift register in response to a second enable signal; and a controller which generates the select signal, the control signal, and the first and second enable signals;

wherein the controller generates the first select signal and the second enable signal, in accordance with a number of remaining bits from a previous cycle and a number of byte enable signals provided during a current cycle.

11. A system for controlling data transfer, comprising:

a data bus which has an n-bit byte width and passes an input data;

a data register which has a (2n–1)-bit byte lane, wherein the data register receives the input data and outputs the input data as is in response to a first enable signal;

a selector which is located at an input side of the data resister and selects an n-bit byte lane from the (2n–1)-bit byte lane of the data register in response to a select signal;

a shift register which is located in an output side of the data resister, wherein the shift register holds the input data in input order when the input data lacks a set data width for outputting, outputs the input data when a bit width of the input data is equal to or more than the set data width, and shifts nothing but a predetermined number of byte lane of a (2n–1)-bit byte lane in response to a control signal;

a data buffer which has an n-bit byte lanes, wherein the data buffer receives and stores output of the register and the shift register in response to a second enable signal; and a controller which generates the select signal, the control signal, and the first and second enable signals;

wherein the controller generates the second select signal in accordance with a number of remained bits from a previous cycle, a number of byte enable signals provided during the present cycle and logic states of the second enable signal provided during a current cycle which shows valid and invalid states.

12. The system for controlling data transfer according to claim 10, wherein the set data width is n-bits.

13. A system for controlling data transfer, comprising:

a data bus which has an n-bit byte width and passes an input data;

a switching circuit which locates in an input side of the memory, and switches a bit order of parallel n-bit byte input data in response to a control signal;

a memory which has a 2n-bit byte lane, constructs with a plurality of line memories and receives the input data, wherein the memory holds the input data of the first cycle when the input data of the first cycle lacks a set data width for outputting in response to a first assignment signal, then receives the input data of a second cycle and outputs a valid data during the second cycle in response to a second assignment signal;

a data buffer which has an n-bit byte lane, wherein the data buffer receives and stores the valid data in response to an enable signal; and a controller which generates the control signal, the first and second assignment signals and the enable signal;

wherein the controller generates the first assignment signal in accordance with a writing point of a previous cycle and a number of byte enable signals provided during a current cycle.

14. A system for controlling data transfer, comprising:
a data bus which has an n-bit byte width and passes an input data;
a switching circuit which locates in an input side of the memory, and switches a bit order of parallel n-bit byte input data in response to a control signal;
a memory which has a 2n-bit byte lane, constructs with a plurality of line memories and receives the input data, wherein the memory holds the input data of the first cycle when the input data of the first cycle lacks a set data width for outputting in response to a first assignment signal, then receives the input data of a second cycle and outputs a valid data during the second cycle in response to a second assignment signal;
a data buffer which has an n-bit byte lane, wherein the data buffer receives and stores the valid data in response to an enable signal; and
a controller which generates the control signal, the first and second assignment signals and the enable signal;
wherein the controller generates the second assignment signal and the enable signal in accordance with a number of remaining bits from a previous cycle and a number of byte enable signals provided during a current cycle.

\* \* \* \* \*